United States Patent
Qin et al.

(10) Patent No.: US 12,308,390 B2
(45) Date of Patent: May 20, 2025

(54) ELECTROLYTE SOLUTION, AND SECONDARY BATTERY, BATTERY MODULE, BATTERY PACK AND ELECTRICAL APPARATUS THEREOF

(71) Applicant: CONTEMPORARY AMPEREX TECHNOLOGY (HONG KONG) LIMITED, Hong Kong (CN)

(72) Inventors: Meng Qin, Ningde (CN); Qisen Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 86 days.

(21) Appl. No.: 18/471,322

(22) Filed: Sep. 21, 2023

(65) Prior Publication Data

US 2024/0021879 A1 Jan. 18, 2024

Related U.S. Application Data

(63) Continuation of application No. PCT/CN2022/083710, filed on Mar. 29, 2022.

(51) Int. Cl.
*H01M 10/0569* (2010.01)
*H01M 10/0525* (2010.01)
*H01M 10/0567* (2010.01)
*H01M 10/0568* (2010.01)

(52) U.S. Cl.
CPC ......... *H01M 10/0569* (2013.01); *H01M 10/0525* (2013.01); *H01M 10/0567* (2013.01); *H01M 10/0568* (2013.01); H01M 2300/0034 (2013.01)

(58) Field of Classification Search
None
See application file for complete search history.

(56) References Cited

U.S. PATENT DOCUMENTS

| | | | |
|---|---|---|---|
| 2015/0037690 A1* | 2/2015 | Dalavi | H01M 10/0525 429/330 |
| 2018/0331393 A1 | 11/2018 | Cho et al. | |
| 2021/0328267 A1* | 10/2021 | Harada | H01M 10/0525 |

FOREIGN PATENT DOCUMENTS

| | | |
|---|---|---|
| CN | 102280664 A | 12/2011 |
| CN | 105789701 A | 7/2016 |
| CN | 109802181 A | 5/2019 |
| JP | 2005340223 A | 12/2005 |
| JP | 2019192607 A | 10/2019 |
| WO | 2017057588 A1 | 4/2017 |
| WO | 2020090986 A1 | 5/2020 |
| WO | 2020158181 A1 | 8/2020 |

OTHER PUBLICATIONS

First Office Action received in the corresponding Japanese Application 2023-540938, mailed on Aug. 19, 2024.
International Search Report received in the corresponding International Application PCT/CN2022/083710, mailed Dec. 16, 2022.
The extended European search report received in the counterpart European Application 22920978.8, mailed on Jan. 23, 2025.
The Decision to Grant a Patent received in the counterpart Japanese Application 2023-540938, mailed on Dec. 2, 2024.

* cited by examiner

*Primary Examiner* — Robert S Carrico
(74) *Attorney, Agent, or Firm* — K&L Gates LLP

(57) ABSTRACT

Provided are an electrolyte solution, comprising an organic solvent, an electrolyte lithium salt, and an additive; wherein the organic solvent comprises a fluorinated solvent; the electrolyte lithium salt comprises a fluorine-containing sulfonylimide lithium salt; and the additive comprises a lithium halide salt. The electrolyte solution of the present application has good conductivity and flame retardancy, and a lithium-ion battery comprising the electrolyte solution has at least one of improved energy density, safety performance, output performance, and cycling performance.

13 Claims, 3 Drawing Sheets

ELECTROLYTE SOLUTION, AND SECONDARY BATTERY, BATTERY MODULE, BATTERY PACK AND ELECTRICAL APPARATUS THEREOF

CROSS-REFERENCE TO RELATED APPLICATIONS

This application is a continuation of International Application No. PCT/CN2022/083710, filed on Mar. 29, 2022 and entitled "ELECTROLYTE SOLUTION, AND SECONDARY BATTERY, BATTERY MODULE, BATTERY PACK AND ELECTRICAL APPARATUS THEREOF", which is incorporated herein by reference in its entirety.

TECHNICAL FIELD

The present application relates to the technical field of lithium batteries, and in particular to an electrolyte solution, and a secondary battery, a battery module, a battery pack and an electrical apparatus comprising the electrolyte solution.

BACKGROUND ART

With the widespread use of electric vehicles and various portable electronic products, lithium-ion batteries have become the preferred energy storage device due to their advantages such as fast charging and discharging and memoryless effect. This makes people put forward higher requirements on the performance of lithium-ion batteries (such as energy density, safety performance, output performance, cycling performance, service life, applicable temperature range). In particular, the safety performance of lithium-ion batteries has been paid more and more attention.

At present, many improvement solutions have been proposed in the art for the performance of lithium-ion batteries. However, for lithium-ion batteries, a single outstanding performance cannot meet the demand, and lithium-ion batteries with good safety and balanced performance are more needed in the art.

SUMMARY OF THE INVENTION

The present application is made in view of the above problems, with the aim of providing an electrolyte solution. The electrolyte solution of the present application can improve the comprehensive performance of lithium-ion batteries.

In order to achieve the above objective, the present application provides an electrolyte solution, and a secondary battery, battery module, battery pack and electrical apparatus comprising the electrolyte solution.

The first aspect of the present application provides an electrolyte solution, comprising an organic solvent, an electrolyte lithium salt, and an additive; wherein the organic solvent comprises a fluorinated solvent; the electrolyte lithium salt comprises a fluorine-containing sulfonylimide lithium salt; and the additive comprises a lithium halide salt. The electrolyte solution of the present application has improved conductivity and flame retardancy, and can also improve the energy density, first-cycle efficiency, cycling and output performance of lithium-ion secondary batteries, and inhibit the growth of lithium dendrites.

In any of embodiments, the fluorine-containing sulfonylimide lithium salt, the lithium halide salt and the fluorinated solvent have following relationship:

$t=[(k*a*c)/(k*a+c)]/b$, and the value of $t$ is in the range of 0.0004 to 0.1000, optionally in the range of 0.0190 to 0.0400, wherein, k is the molar concentration of the electrolyte lithium salt in mol/L; a is the molar percentage of the fluorine-containing sulfonylimide lithium salt based on the total molar weight of the electrolyte lithium salt; b is the weight percentage of the fluorinated solvent based on the total weight of the organic solvent; c is the weight percentage of the lithium halide salt based on the total weight of the electrolyte solution; and each of a, b, c and k is not equal to 0. When the contents of the fluorinated solvent, the fluorine-containing sulfonylimide lithium salt and the lithium halide salt in the electrolyte solution conform to the above relational formula and its parameter range, the performance of the electrolyte solution is good, and the comprehensive performance of the lithium-ion secondary battery is good.

In any of embodiments, based on the total weight of the organic solvent, the content of the fluorinated solvent is 20% by weight or more; optionally 50% by weight or more; and more optionally 80% by weight or more. By increasing the content of the fluorinated solvent, the comprehensive performance of the electrolyte solution can be further improved.

In any of embodiments, the molar concentration of the electrolyte lithium salt is 0.5 mol/L to 8 mol/L, optionally 1.5 mol/L to 4 mol/L. The electrolyte salt within the above range can further improve the performance of the electrolyte solution (e.g., in particular, conductivity).

In any of embodiments, based on the total weight of the electrolyte solution, the content of the lithium halide salt is 0.05% by weight to 10% by weight, optionally 0.5% by weight to 7% by weight, and more optionally 1% by weight to 6% by weight. By selecting the content of the lithium salt, the performance of the electrolyte solution can be further improved.

In any of embodiments, based on the total molar weight of the electrolyte lithium salt, the molar percentage of the fluorine-containing sulfonylimide lithium salt is at least 30%, optionally at least 60%, and more optionally at least 90%. The performance of the electrolyte solution can be further improved by making the proportion of the fluorine-containing sulfonylimide lithium salt in the electrolyte lithium salt within the above range.

In any of embodiments, the fluorinated solvent is selected from at least one of fluorocarbonate, fluorophosphate, and fluoroether; optionally, the fluorinated solvent is selected from at least one of fluorocarbonate and fluoroether. By selecting the above-mentioned types of fluorinated solvents, the present application further improves the above-mentioned properties of the electrolyte solution and the battery.

In any of embodiments, the fluorocarbonate is selected from at least one of fluoroethylene carbonate, fluoroethyl methyl carbonate, bisfluoroethylene carbonate, 4-trifluoromethyl ethyl ene carbonate and bis(2,2,2-trifluoroethyl) carbonate; the fluorophosphate is selected from at least one of tri(2,2,2-difluoroethyl)phosphate and tri(2,2,2-trifluoroethyl) phosphate; the fluoroether is selected from at least one of hydrofluoroether, 3-(2,2,3,3-tetrafluoropropoxy)-1,2-epoxypropane, 1,1,2,2-tetrafluoroethyl-2,2,3,3-tetrafluoropropyl ether, methyl nonafluorobutyl ether, ethyl nonafluorobutyl ether, 1,1,2,2-tetrafluoroethyl-2,2,2-trifluoroethyl ether and nonafluoroisobutyl methyl ether.

In any of embodiments, the fluorinated solvent is selected from at least one of fluoroethylene carbonate, fluoroethyl methyl carbonate and hydrofluoroether; optionally, the fluorinated solvent is a mixture of at least two of fluoroethylene carbonate, fluoroethyl methyl carbonate and hydrofluoroether; and more optionally, the fluorinated solvent is a mixture of fluoroethylene carbonate, fluoroethyl methyl carbonate and hydrofluoroether.

By further selecting the fluorinated solvent, the performance of the electrolyte solution of the present application and the battery containing the electrolyte solution is further improved.

In any of embodiments, when the fluorinated solvent is a mixture of at least two of fluoroethylene carbonate, fluoroethyl methyl carbonate and hydrofluoroether, based on the total weight of the fluorinated solvent, the content of the fluoroethylene carbonate is 10% to 50%, optionally 20% to 40%; and/or, the content of the hydrofluoroether is 10% to 50%, optionally 20% to 40%; and/or the content of the fluoroethyl methyl carbonate is 0 to 80%, optionally 20% to 60%. The respective amounts of the fluorinated solvents are within the above-mentioned ranges, which can further improve the performance of the electrolyte solution and the battery thereof.

In any of embodiments, the lithium halide salt is selected from at least one of lithium iodide, lithium bromide, lithium chloride and lithium fluoride; optionally, at least one of lithium iodide and lithium bromide. By selecting the lithium halide salt, the performance of the electrolyte solution can be further improved, which especially helps to inhibit the growth of lithium dendrites.

In any of embodiments, the fluorine-containing sulfonylimide lithium salt is selected from at least one of lithium bis (fluorosulfonyl) imide, lithium bis(trifluoromethanesulfonyl) imide, lithium bis (pentafluoroethanesulfonyl) imide and lithium bis(perfluoro-1-butanesulfonyl) imide; optionally at least one of lithium bis (fluorosulfonyl) imide and lithium bis (trifluoromethanesulfonyl) imide. Further selection of the fluorine-containing sulfonylimide lithium salt can improve the performance of the electrolyte solution and battery of the present application.

In any of embodiments, the organic solvent further comprises a carbonate solvent; optionally, the carbonate solvent is selected from at least one of diethyl carbonate, ethyl methyl carbonate, dimethyl carbonate, ethylene carbonate and propylene carbonate. By including the above-mentioned organic solvent, the purpose of improving the performance of the electrolyte solution can be achieved while reducing the cost.

In any of embodiments, the electrolyte lithium salt further includes at least one of lithium hexafluorophosphate, lithium tetrafluoroborate, lithium hexafluoroarsenate and lithium perchlorate. By further selecting and adding the above electrolyte lithium salt, the cost can be controlled while realizing the technical effect of the present application.

In any of embodiments, the electrolyte solution further comprises at least one of film-forming additives, flame retardant additives, anti-overcharge additives and conductive additives. Adding the above-mentioned additives can further improve the performance of the electrolyte solution in a targeted manner.

A second aspect of the present application provides a secondary battery comprising the electrolyte solution of claim 1.

A third aspect of the present application provides a battery module comprising the secondary battery of the above-mentioned second aspect.

A fourth aspect of the present application provides a battery pack comprising the battery module of the above-mentioned third aspect.

A fifth aspect of the present application provides an electrical apparatus comprising at least one selected from the secondary battery of the second aspect, the battery module of the third aspect, or the battery pack of the fourth aspect of the present application.

The electrolyte solution of the present application at least achieves the following effects: the electrolyte solution has good conductivity and flame retardancy, and the lithium-ion battery comprising the electrolyte solution has at least one of improved energy density, safety performance, output performance, and cycling performance.

Figure 1:
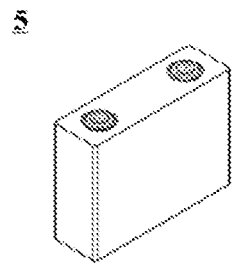
FIG. 1 is a schematic view of a secondary battery according to an embodiment of the present application.

DESCRIPTION OF REFERENCE NUMERALS 1 battery pack; 2 upper box body; 3 lower box body; 4 battery module; 5 secondary battery; 51 case; 52 electrode assembly; 53 top cover assembly

DETAILED DESCRIPTION

Hereinafter, the embodiments of the electrolyte solution, secondary battery, battery module, battery pack and electrical apparatus of the present application are specifically disclosed by referring to the detailed description of the drawings as appropriate. However, there are cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if ranges of 60-120 and 80-110 are listed for a particular parameter, it is understood that ranges of 60-110 and 80-120 are also expected. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5"

means that all real numbers between "0-5" have been listed herein, and "0-5" is just an abbreviated representation of the combination of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method comprises steps (a) and (b), meaning that the method may comprise steps (a) and (b) performed sequentially, or may comprise steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

Unless otherwise specified, the terms "include/including" and "comprise/comprising" mentioned in the present application may be open-ended or closed-ended. For example, the "including" and "comprising" may indicate that it is possible to include or comprise other components not listed, and it is also possible to include or comprise only the listed components.

Unless otherwise specified, the term "or" is inclusive in the present application. By way of example, the phrase "A or B" means "A, B, or both A and B". More specifically, the condition "A or B" is satisfied by any of the following: A is true (or present) and B is false (or absent); A is false (or absent) and B is true (or present); or both A and B are true (or present).

With the widespread use of electric vehicles and various portable electronic products, lithium-ion secondary batteries are the preferred energy storage devices for such electrical equipment. How to achieve long battery life and energy storage has become a widely concerned issue. Therefore, lithium-ion batteries with higher energy density are needed in the art to achieve long battery life and energy storage, and high working voltage is one of the methods to improve the energy density of lithium-ion batteries.

Electrolyte solution is an important component of lithium-ion batteries, and it is also one of the focuses of those skilled in the art. Electrolyte solution generally comprises solvents, electrolyte salts and (optionally) various additives. At present, the widely used solvents mainly include carbonates, carboxylates and ethers, and the electrolyte salts mainly include $LiPF_6$, $LiAsF_6$, $LiBF_4$, $LiClO_4$ and so on. However, these solvents and/or electrolyte salts are generally not suitable for high working voltages (e.g., above 4.2V), because electrolyte solutions based on these solvents and/or salts will undergo oxidative decomposition at such working voltages, resulting in the decline of the overall performance of the battery. Moreover, the safety of high-voltage lithium-ion batteries will decrease as the working voltage increases. In addition, the problems of flammability, explosion, and easy decomposition of traditional solvents and electrolytes as mentioned above will further bring safety hazards to batteries.

In order to obtain a safe high-voltage electrolyte solution, various attempts have been made in the art, such as changing solvents, electrolyte salts or adding functional additives. The fluorinated solvent has excellent chemical stability, and as an additive or solvent, it helps to improve the flame retardancy of the electrolyte solution, and can improve the oxidative decomposition voltage of the electrolyte solution. Using organic fluorine-containing lithium salts (such as lithium bis (fluorosulfonyl) imide ($Li[N(SO_2F)_2]$, LiFSI)) as electrolyte salts to partially or completely replace the currently commonly used inorganic lithium salts (such as $LiPF_6$) helps to achieve better chemical stability of the high-voltage electrolyte solution.

Although the above-mentioned efforts have improved the performance and safety performance of the electrolyte solution under high working voltage to a certain extent, the one-sided performance improvement cannot meet the needs of the lithium-ion battery with good performance in the art—because what the field needs is a lithium-ion battery with good comprehensive performance that can achieve a careful balance among various properties (such as energy density, safety performance, output performance, cycling performance).

In view of the above problems, the present application provides a high-voltage electrolyte solution, which not only improves the safety performance, but also takes into account other properties, and achieves the goal of balancing the properties of the electrolyte solution and achieving good comprehensive performance.

Electrolyte Solution

In an embodiment of the present application, provided is an electrolyte solution, comprising an organic solvent, an electrolyte lithium salt, and an additive; wherein the organic solvent comprises a fluorinated solvent; the electrolyte lithium salt comprises a fluorine-containing sulfonylimide lithium salt; and the additive comprises a lithium halide salt.

In the present application, the electrolyte lithium salt comprises a fluorine-containing sulfonylimide lithium salt, but does not comprise the lithium halide salt; in other words, the electrolyte lithium salt comprises a fluorine-containing sulfonylimide lithium salt, and optionally comprises other suitable lithium salts other than lithium fluorine-containing sulfonylimide salts and lithium halide salts. However, it should be understood that the electrolyte solution of the present application comprises a lithium halide salt.

The inventors found that the electrolyte solution of the present application has good conductivity and flame retardancy, and can improve the safety of lithium-ion batteries. In addition, by using the electrolyte solution of the present application, the lithium-ion battery can obtain good comprehensive performance, for example, high energy density, high first-cycle specific capacity, and good cycling performance.

Although the mechanism is not yet clear, the inventors have also found that there is a synergistic effect between the fluorinated solvent, the fluorine-containing sulfonylimide lithium salt and the lithium halide salt comprised in the electrolyte solution of the present application, which can significantly inhibit the undesired lithium dendrite growth in the lithium-ion secondary battery, thereby further improving the safety.

In addition, the inventors also found that the electrolyte solution of the present application can also improve the first-cycle efficiency of lithium-ion batteries. In particular, the first-cycle efficiency of the lithium-ion battery comprising the electrolyte solution of the present application is more than 85%, and such a high first-cycle efficiency shows that the electrolyte solution of the present application can reduce the initial irreversible capacity loss of the lithium-ion battery and further improve the energy density of the battery.

As used herein, the term "first-cycle efficiency", also known as "initial coulombic efficiency", refers to the ratio in percentage of discharge capacity to charge capacity in the first charge-discharge cycle of a lithium-ion battery.

As used herein, the term "first-cycle specific capacity" refers to the discharge specific capacity in the first charge-discharge cycle.

In some embodiments, the fluorine-containing sulfonylimide lithium salt, the lithium halide salt and the fluorinated solvent in the electrolyte solution of the present application having following relationship:

$$t=[(k*a*c)/(k*a+c)]/b,\text{ and the value of }t\text{ is in the range of 0.0004 to 0.1000, optionally in the range of 0.0190 to 0.0400,}$$

wherein, k is the molar concentration of the electrolyte lithium salt in mol/L;

a is the molar percentage of the fluorine-containing sulfonylimide lithium salt based on the total molar weight of the electrolyte lithium salt;

b is the percentage by weight of the fluorinated solvent based on the total weight of the organic solvent;

c is the percentage by weight of the lithium halide salt based on the total weight of the electrolyte solution; and each of a, b, c and k is not equal to 0.

In some embodiments, the value of t is in the range of 0.0190-0.0210, in the range of in the range of 0.0195-0.0200, in the range of 0.0196-0.0200, or in the range of 0.0197-0.0200.

The inventors of the present application have found that when the above relational formula is met between the fluorinated solvent, the electrolyte lithium salt and the lithium halide salt in the electrolyte solution, good performance can be achieved, for example, improved safety (e.g., flame retardancy and inhibition of dendrite growth), improved conductivity; and lithium-ion batteries comprising the electrolyte solution have good energy density, output performance, cycling performance, especially high first-cycle efficiency.

In some embodiments, in the electrolyte solution, based on the total weight of the organic solvent, the content of the fluorinated solvent is 20% by weight or more; optionally 50% by weight or more; and more optionally 80% by weight or more. In some embodiments, based on the total weight of the organic solvent, the content of the fluorinated solvent is optionally 90% by weight or more.

In some embodiments, based on the total weight of the organic solvent, the content of the fluorinated solvent is 20% by weight or more, 30% by weight or more, 40% by weight or more, 50% by weight or more, 60% by weight or more, 70% by weight or more, 80% by weight or more, 90% by weight or more, or 95% by weight or more. In some embodiments, the fluorinated solvent is present in an amount of 100% by weight based on the total weight of the organic solvent; in this case, the organic solvent consists of the fluorinated solvent.

When the content of the fluorinated solvent in the organic solvent is in the above range, the conductivity and flame retardancy of the electrolyte solution can be further improved, and the comprehensive performance (e.g., energy density, first-cycle specific capacity, first-cycle efficiency, and capacity retention rate) of the lithium-ion battery comprising the electrolyte solution can be further improved.

In some embodiments, the molar concentration of the electrolyte lithium salt in the electrolyte solution of the present application is 0.5 mol/L to 8 mol/L, optionally 1.5 mol/L to 4 mol/L.

In some embodiments, the electrolyte lithium salt is present in an amount of 0.5 mol/L to 8 mol/L, optionally 0.5 mol/L to 5 mol/L, more optionally 1 mol/L to 4 mol/L, further more optionally 1.5 mol/L to 4 mol/L, and still more optionally 2 mol/L to 4 mol/L. In some embodiments, the electrolyte lithium salt is present at an amount of 0.5 mol/L, 1 mol/L, 1.5 mol/L, 2 mol/L, 2.5 mol/L, 3 mol/L, 3.5 mol/L, 4 mol/L, 4.5 mol/L, 5 mol/L, 6 mol/L, 7 mol/L or 8 mol/L; or, in some embodiments, the content of the electrolyte lithium salt is within the range consisting of any two of the above numerical values.

The inventors found that when the content of the electrolyte lithium salt is within the above range, the viscosity of the electrolyte solution is moderate, which helps to improve the conductivity of the electrolyte solution. However, when the concentration of the electrolyte lithium salt is too high, the overall concentration of the electrolyte solution will increase, but the degree of dissociation of the salt in the electrolyte solution will decrease, and the viscosity of the electrolyte solution will also increase, which will instead lead to a decrease in the conductivity of the electrolyte solution.

The concentration units "M" and "mol/L" are used interchangeably herein.

In some embodiments, in the electrolyte solution of the present application, based on the total weight of the electrolyte solution, the content of the lithium halide salt is 0.05% by weight to 10% by weight, optionally 0.5% by weight to 7% by weight, and more optionally 1% by weight to 6% by weight.

In some embodiments, optionally, based on the total weight of the electrolyte solution, the content of the lithium halide salt may further be 1% by weight to 4% by weight, and more preferably 2% by weight to 4% by weight. In some embodiments, based on the total weight of the electrolyte solution, the content of the lithium halide salt is 0.05% by weight, 1% by weight, 1.5% by weight, 2% by weight, 2.5% by weight, 3% by weight, 4% by weight, 5% by weight, 6% by weight, 7% by weight, 8% by weight, 9% by weight or 10% by weight; or in some embodiments, the content of the lithium halide salt is within the range consisting of any two of the above numerical values.

By controlling the content of the lithium halide salt in the electrolyte solution within the above-mentioned range, the lithium-ion secondary battery has good comprehensive performance, and in particular, can achieve an ideal effect of inhibiting dendrite growth.

In some embodiments, in the electrolyte solution of the present application, based on the total molar weight of the electrolyte lithium salt, the molar percentage of the fluorine-containing sulfonylimide lithium salt is at least 30%, optionally at least 60%, and more optionally at least 90%.

In some embodiments, based on the total molar weight of the electrolyte lithium salt, the molar percentage of the fluorosulfonylimide lithium salt is at least 30%, at least 35%, at least 40%, at least 45%, at least 50%, at least 55%, at least 60%, at least 65%, at least 70%, at least 75%, at least 80%, at least 85%, at least 90%, or at least 95%. In some embodiments, based on the total molar weight of the electrolyte lithium salt, the molar percentage of the fluorine-containing sulfonylimide lithium salt is 100%; in other words, the electrolyte lithium salt consists of the fluorine-containing sulfonylimide lithium salt.

When the molar percentage of the fluorosulfonylimide lithium salt is within the above range, the thermal stability of the electrolyte solution can be further improved, the electrochemical window can be widened, and the cycling performance and rate performance of the battery can be further improved.

In some embodiments, in the electrolyte solution of the present application, the fluorinated solvent is selected from at least one of fluorocarbonate, fluorophosphate, and fluoroether; optionally, the fluorinated solvent is selected from at least one of fluorocarbonate and fluoroether. Selecting the above-mentioned fluorinated solvent can further improve the performance of the electrolyte solution.

In some embodiments, the fluorocarbonate is selected from at least one of fluoroethylene carbonate (FEC), fluoroethyl methyl carbonate (FEMC), difluoroethylene carbonate (DFEC), 4-trifluoromethyl ethylene carbonate (TFPC) and bis(2,2,2-trifluoroethyl) carbonate (TFEC). In some embodiments, the fluorophosphate is selected from at least one of tris(2,2,2-difluoroethyl) phosphate (TFHP) and tris (2,2,2-trifluoroethyl) phosphate (TTFP).

In some embodiments, the fluoroether is selected from at least one of hydrofluoroether (HFE), 3-(2,2,3,3-tetrafluoroprop oxy)-1,2-ep oxyprop ane (HFEEC), 1,1,2,2-tetrafluoroethyl-2,2,3,3-tetrafluoropropyl ether (F-EPE), methyl nonafluorobutyl ether (MFE), ethyl nonafluorobutyl ether (EFE), 1,1,2,2-tetrafluoroethyl-2,2,2-trifluoroethyl ether and nonafluoroisobutyl methyl ether.

As mentioned above, by selecting a fluorinated solvent, it is possible to improve the conductivity and flame retardancy of the electrolyte solution, and at least one of the energy density, first-cycle specific capacity, first-cycle efficiency, and cycling performance of a battery containing the electrolyte solution.

In some embodiments, in the electrolyte solution of the present application, the fluorinated solvent is selected from at least one of fluoroethylene carbonate, fluoroethyl methyl carbonate and hydrofluoroether; optionally, the fluorinated solvent is a mixture of at least two of fluoroethylene carbonate, fluoroethyl methyl carbonate and hydrofluoroether; and more optionally, the fluorinated solvent is a mixture of fluoroethylene carbonate, fluoroethyl methyl carbonate and hydrofluoroether.

In some embodiments, the fluorinated solvent is selected from at least one of fluorocarbonate and fluoroether. In some embodiments, the fluorinated solvent may be selected from: FEC; FEMC; HFE; a mixture of FEC and HFE; or a mixture of FEC, FEMC and HFE. The inventors found that, for the electrolyte solution of the present application, the performance of the electrolyte solution obtained by using a mixture of fluorinated solvents is better than that using a single fluorinated solvent. In some embodiments, the fluorinated solvent may be selected from: a mixture of FEMC, FEC and HFE, and a mixture of FEC, FEMC and HFE. Optionally, the fluorinated solvent is a mixture of FEC, FEMC and HFE. Further selection of fluorinated solvents can improve the conductivity and flame retardancy of the electrolyte solution, and at least one of the energy density, first-cycle specific capacity, first-cycle efficiency and cycling performance of batteries comprising the electrolyte solution, especially can further improve the flame retardancy and conductivity of the electrolyte solution.

In some embodiments, in the electrolyte solution of the present application, when the fluorinated solvent is a mixture of at least two of fluoroethylene carbonate, fluoroethyl methyl carbonate and hydrofluoroether, based on the total weight of the fluorinated solvent, the content of the fluoroethylene carbonate is 10% to 50%, optionally 20% to 40%; and/or, the content of the hydrofluoroether is 10% to 50%, optionally 20% to 40%; and/or the content of the fluoroethyl methyl carbonate is 0 to 80%, optionally 20% to 60%.

In some embodiments, in the electrolyte solution of the present application, when the fluorinated solvent is a mixture of at least two of fluoroethylene carbonate, fluoroethyl methyl carbonate and hydrofluoroether, based on the total weight of the fluorinated solvent, the fluorinated solvent comprises at least 10% of fluoroethylene carbonate, and/or at least 10% of hydrofluoroether.

Optionally, in some embodiments, based on the total weight of the fluorinated solvent, the content of the fluoroethylene carbonate is 10% to 50%, optionally 20% to 40%, and more optionally 30%. In some embodiments, based on the total weight of the fluorinated solvent, the content of the fluoroethylene carbonate is 10%, 15%, 20%, 25%, 30%, 35%, 40%, 45% or 50%; or, the content of the fluoroethylene carbonate is within the range consisting of any two of the above numerical values.

Optionally, in some embodiments, based on the total weight of the fluorinated solvent, the content of the fluoroethyl methyl carbonate is 0 to 80%, optionally 20% to 60%, and more optionally 40%. In some embodiments, based on the total weight of the fluorinated solvent, the content of the fluoroethyl methyl carbonate is 0%, 10%, 15%, 20%, 25%, 30%, 35%, 40%, 45%, 50%, 55%, 60%, 65%, 70%, 75% or 80%; or, the content of the fluoroethyl methyl carbonate is within the range consisting of any two of the above numerical values.

Optionally, in some embodiments, based on the total weight of the fluorinated solvent, the content of the hydrofluoroether is 10% to 50%, optionally 20% to 40%, and more optionally 30%. In some embodiments, based on the total weight of the fluorinated solvent, the content of the hydrofluoroether is 10%, 15%, 20%, 25%, 30%, 35%, 40%, 45% or 50%; or, the content of the hydrofluoroether is within the range consisting of any two of the above numerical values.

Controlling the contents of the components in the fluorinated solvent within the above ranges can further improve the comprehensive performance of the electrolyte solution.

In some embodiments, in the electrolyte solution of the present application, when the fluorinated solvent is a mixture of at least two of fluoroethylene carbonate, fluoroethyl methyl carbonate and hydrofluoroether, the weight ratio of fluoroethylene carbonate (FEC), fluoroethyl methyl carbonate (FEMC) and hydrofluoroether (HFE) is (1 to 5):(0 to 8):(1 to 5); optionally (2 to 4):(2 to 6):(2 to 4); and more optionally, the weight ratio is 3:4:3. When the fluorinated solvent is a mixture of at least two of FEC, FEMC and HFE, the contents of the components in the mixture are controlled within the above ratio range, which can further improve the performance of the electrolyte solution and the comprehensive performance of the battery comprising the electrolyte solution.

Herein, in the weight ratio of the components of the mixture, when the value corresponding to a certain component is 0, it means that the component is not included in the mixture at this time. For example, in the weight ratio of FEC, FEMC and HFE, if the value corresponding to FEMC is it means that the mixture only contains FEC and HFE at this time.

Herein, "/" means "and"; for example, "FEC/FEMC/HFE" means that the fluorinated solvent comprises all three of FEC, FEMC, and HFE; that is, the fluorinated solvent is a mixture of FEC, FEMC, and HFE. Herein, when describing the composition of the solvent, "FEC/FEMC/HFE (3:4:

3)" means that the weight ratio of FEC, FEMC and HFE in the fluorinated solvent mixture is 3:4:3.

In some embodiments, in the electrolyte solution of the present application, the lithium halide salt is selected from at least one of lithium iodide, lithium bromide, lithium chloride and lithium fluoride; optionally, at least one of lithium iodide and lithium bromide. In some embodiment, the lithium halide salt is lithium iodide. By selecting and adding lithium halide salts, the electrolyte solution of the present application has improved conductivity and flame retardancy, thereby improving at least one of the energy density, first-cycle specific capacity, first-cycle efficiency and cycling performance of lithium-ion batteries. Unexpectedly, the addition of the above-mentioned lithium halide salt can effectively inhibit the growth of dendrites and further improve the safety performance of the battery.

In some embodiments, in the electrolyte solution of the present application, the fluorine-containing lithium sulfonylimide salt is selected from at least one of lithium bis (fluorosulfonyl) imide (LiFSI), lithium bis (trifluoromethanesulfonyl) imide (LiTFSI), lithium bis (pentafluoroethanesulfonyl) imide (LiBETI) and lithium bis(perfluoro-1-butanesulfonyl) imide (LiBPBI); optionally at least one of lithium bis (fluorosulfonyl) imide and lithium bis (trifluoromethanesulfonyl) imide. In some embodiments, the fluorine-containing sulfonylimide lithium salt is LiFSI. By selecting the electrolyte lithium salt in the electrolyte solution, it can improve the conductivity and flame retardancy of the electrolyte solution, and at least one of the energy density, first-cycle specific capacity, first-cycle efficiency, and cycling performance of a battery containing the electrolyte solution. In particular, in the case of selecting the above-mentioned fluorinated solvent, selecting the above-mentioned electrolyte salt can significantly improve the conductivity of the electrolyte solution.

In some embodiments, in the electrolyte solution of the present application, the organic solvent further comprises a non-fluorinated organic solvent. In some embodiments, the organic solvent further comprises a carbonate solvent; optionally, the carbonate solvent is selected from at least one of diethyl carbonate (DEC), ethyl methyl carbonate (EMC), dimethyl carbonate (DMC), ethylene carbonate (EC) and propylene carbonate (PC). Optionally, the organic solvent comprises EMC. Including the above-mentioned solvent in the electrolyte solution can dissolve and dissociate the lithium salt and improve the mobility of lithium ions.

In some embodiments, in the electrolyte solution of the present application, the electrolyte lithium salt also includes at least one of lithium hexafluorophosphate ($LiPF_6$), lithium tetrafluoroborate ($LiBF_4$), lithium hexafluoroarsenate ($LiAsF_6$) and lithium perchlorate ($LiClO_4$). In some embodiments, the electrolyte salt is optionally $LiPF_6$. By further comprising the above electrolyte lithium salt, the cost can be reduced and the conductivity of the electrolyte solution can be improved, thereby improving the comprehensive performance of the electrolyte solution.

In some embodiments, the electrolyte solution of the present application further comprises other functional additives, which may be any additives known in the art that are applicable in the context of the present application. In some embodiments, in the electrolyte solution of the present application, the electrolyte solution further comprises at least one of film-forming additives, flame retardant additives, anti-overcharge additives and conductive additives. Comprising the above-mentioned additives in the electrolyte solution can further improve the performance of the electrolyte solution.

Although the mechanism is not clear, the inventors found that there is a "synergistic effect" between the fluorinated solvent, the electrolyte lithium salt and the lithium halide salt comprised in the electrolyte solution of the present application, which can effectively suppress the undesirable growth of lithium dendrites, and thereby can further improve the safety performance of lithium-ion secondary batteries.

In some embodiments, the electrolyte solution of the present application is a high-voltage electrolyte solution.

In some embodiments, the electrolyte solution of the present application is used in a lithium-ion battery with a non-lithium metal negative electrode. Optionally, the electrolyte solution of the present application is used in lithium-ion batteries with graphite negative electrodes.

By using the electrolyte solution of the present application, the lithium-ion secondary battery with a graphite negative electrode can significantly inhibit the growth of lithium dendrites at a relatively high working voltage (for example, higher than 4.2V), and has good comprehensive performance.

Secondary Battery, Battery Module, Battery Pack and Electrical Apparatus

The secondary battery, battery module, battery pack and electrical apparatus of the present application will be described hereafter with appropriate reference to the drawings.

In an embodiment of the present application, a secondary battery is provided.

Generally, the secondary battery includes a positive electrode plate, a negative electrode plate, an electrolyte, and a separator. During the charging and discharging process of the battery, active ions are intercalated and deintercalated back and forth between the positive electrode plate and the negative electrode plate. The electrolyte plays the role of conduct ions between the positive electrode plate and the negative electrode plate. The separator is provided between the positive electrode plate and the negative electrode plate, and mainly functions to prevent a short circuit between the positive electrode and the negative electrode while allowing ions to pass through.

In some embodiments, the secondary battery is a lithium-ion secondary battery.

[Positive Electrode Plate]

The positive electrode plate includes a positive electrode current collector and a positive electrode film layer provided on at least one surface of the positive electrode current collector, and the positive electrode film layer includes the positive electrode active material of the first aspect of the present application.

As an example, the positive electrode current collector has two opposite surfaces in its own thickness direction, and the positive electrode film layer is arranged on either or both of the two opposite surfaces of the positive electrode current collector.

In some embodiments, the positive electrode current collector can be a metal foil or a composite current collector. For example, an aluminum foil can be used as the metal foil. The composite current collector may include a high molecular material substrate layer and a metal layer formed on at least one surface of the high molecular material substrate layer. The composite current collector can be formed by forming a metal material (aluminum, aluminum alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In some embodiments, the positive electrode active material may be a positive electrode active material for batteries well known in the art. As an example, the positive electrode active material may include at least one of the following materials: a lithium-containing phosphate of olivine structure, a lithium transition metal oxide, and a respective modified compound thereof. However, the present application is not limited to these materials, and other conventional materials useful as positive electrode active materials for batteries can also be used. It is possible to use only one of these positive electrode active materials alone, or to use more than two in combination. Here, examples of the lithium transition metal oxide may include, but are not limited to, at least one of a lithium-cobalt oxide (such as $LiCoO_2$), lithium-nickel oxide (such as $LiNiO_2$), lithium-manganese oxide (such as $LiMnO_2$ and $LiMn_2O_4$), lithium-nickel-cobalt oxide, lithium-manganese-cobalt oxide, lithium-nickel-manganese oxide, lithium-nickel-cobalt-manganese oxide (such as $LiN_{1/3}Co_{1/3}Mn_{1/3}O_2$ (also abbreviated as $NCM_{333}$), $LiNi_{0.5}Co_{0.2}Mn_{0.3}O_2$ (also abbreviated as $NCM_{523}$), $LiNi_{0.5}Co_{0.25}Mn_{0.25}O_2$ (also abbreviated as $NCM_{211}$), $LiNi_{0.6}Co_{0.2}Mn_{0.2}O_2$ (also abbreviated as $NCM_{622}$), $LiNi_{0.85}Co_{0.15}Mn_{0.1}O_2$ (also abbreviated as $NCM_{811}$)), lithium-nickel-cobalt-aluminum oxide (such as $LiNi_{0.85}Co_{0.15}Al_{0.005}O_2$) and their respective modified compounds. Examples of the lithium-containing phosphate with olivine structure may include, but are not limited to, at least one of lithium iron phosphate (such as $LiFePO_4$ (also abbreviated as LFP)), lithium iron phosphate-carbon composite, lithium manganese phosphate (such as $LiMnPO_4$), lithium manganese phosphate-carbon composite, lithium manganese iron phosphate, and lithium manganese iron phosphate-carbon composite.

In some embodiments, the positive electrode film layer further optionally comprises a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethyl ene-hexafluoropropylene copolymer and a fluorine-containing acrylate resin.

In some embodiments, the positive electrode film layer further optionally comprises a conductive agent. For example, the conductive agent may include at least one of superconducting carbon, acetylene black, carbon black, Ketjen black, carbon dot, carbon nanotubes, graphene, and carbon nanofibers.

In some embodiments, the positive electrode plate can be prepared by dispersing the components for preparing the positive electrode plate, for example, the positive electrode active material, the conductive agent, the binder and any other components in a solvent (for example, N-methyl pyrrolidone) to form a positive electrode slurry; and coating the positive electrode slurry on a positive electrode current collector, followed by oven drying, cold pressing and other procedures, to obtain the positive electrode plate.

[Negative Electrode Plate]

The negative electrode plate includes a negative-electrode current collector and a negative-electrode film layer arranged on at least one surface of the negative-electrode current collector, wherein the negative-electrode film layer includes a negative-electrode active material. As an example, the negative electrode current collector has two opposite surfaces in its own thickness direction, and the negative electrode film layer is provided on either one or both of the two opposite surfaces of the negative electrode current collector.

In some embodiments, the negative electrode current collector can be a metal foil or a composite current collector. For example, a copper foil can be used as the metal foil. The composite current collector may include a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In some embodiments, a negative electrode active material for the battery well known in the art can be used as the negative electrode active material. As an example, the negative electrode active material may include at least one of the following materials: artificial graphite, natural graphite, soft carbon, hard carbon, silicon-based material, tin-based material, and lithium titanate, etc. The silicon-based material may be at least one selected from elemental silicon, a silicon-oxygen compound, a silicon-carbon composite, a silicon-nitrogen composite, and a silicon alloy. The tin-based material may be at least one selected from elemental tin, a tin-oxygen compound, and a tin alloy. However, the present application is not limited to these materials, and other conventional materials useful as negative electrode active materials for batteries can also be used. These negative electrode active materials may be used alone or in combination of two or more thereof.

In some embodiments, the negative electrode film layer further optionally comprises a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally comprises a conductive agent. The conductive agent may be selected from at least one of superconducting carbon, acetylene black, carbon black, Ketjen black, carbon dot, carbon nanotube, graphene, and carbon nanofiber.

In some embodiments, the negative electrode film layer may further optionally comprise other auxiliaries, for example, a thickener (e. g., sodium carboxymethyl cellulose (CMC-Na)) and the like.

In some embodiments, the negative electrode plate can be prepared by dispersing the components for preparing the negative electrode plate, for example, the negative electrode active material, the conductive agent, the binder and any other components in a solvent (for example, deionized water) to form a negative electrode slurry; and coating the negative electrode slurry on a negative electrode current collector, followed by oven drying, cold pressing and other procedures, to obtain the negative electrode plate.

[Separator]

In some embodiments, the secondary battery also comprises a separator. The type of the separator is not particularly limited in the present application, and any well-known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multi-layer composite film, the material of each layer may be the same or different, which is not particularly limited.

In some embodiments, the positive electrode plate, the negative electrode plate, and the separator can be made into an electrode assembly by a winding process or a stacking process.

In some embodiments, the secondary battery may include an outer package. The outer package can be used to encapsulate the above-mentioned electrode assembly and electrolyte.

In some embodiments, the outer package of the secondary battery may be a hard shell, such as a hard plastic shell, an aluminum shell, and a steel shell. The outer package of the secondary battery may also be a soft pack, such as a bag-type soft pack. The material of the soft package can be plastic, and as plastic, polypropylene, polybutylene terephthalate, and polybutylene succinate can be enumerated.

The present application has no particular limitation on the shape of the secondary battery, which can be cylindrical, square or any other shape. For example, FIG. 1 shows a secondary battery 5 with a square structure as an example.

Figure 2:
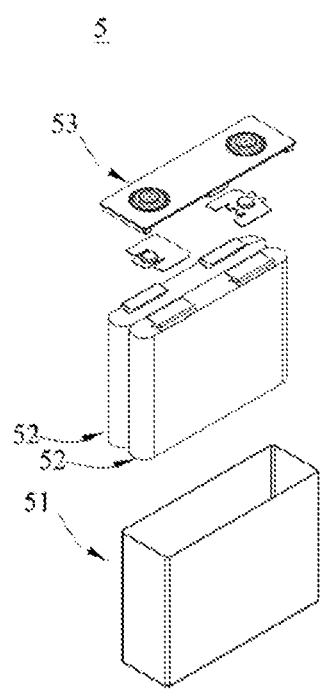
FIG. 2 is an exploded view of the secondary battery according to an embodiment of the present application shown in FIG. 1.

In some embodiments, referring to FIG. 2, the outer package may comprise a case 51 and a cover plate 53. Here, the case 51 can include a bottom plate and a side plate connected to the bottom plate, with the bottom plate and the side plate enclosing to form an accommodating cavity. The case 51 has an opening that communicates with the accommodating cavity, and the cover plate 53 may cover the opening to close the accommodating cavity. The positive electrode plate, the negative electrode plate, and the separator may be formed into an electrode assembly 52 by a winding process or a stacking process. The electrode assembly 52 is encapsulated within the accommodating cavity. The electrolyte solution impregnates the electrode assembly 52. The number of electrode assemblies 52 comprised in the secondary battery 5 may be one or more, which can be selected by those skilled in the art according to specific actual requirements.

In some embodiments, the secondary batteries may be assembled into a battery module, and the number of the secondary batteries included in the battery module may be one or more, and the specific number may be selected by those skilled in the art according to the application and capacity of the battery module.

Figure 3:
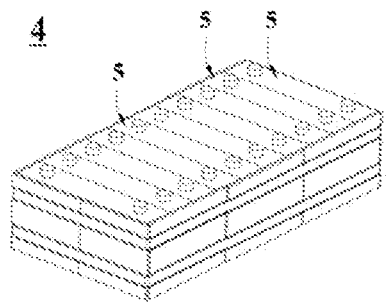
FIG. 3 is a schematic diagram of a battery module according to an embodiment of the present application.

FIG. 3 shows a battery module 4 as an example. Referring to FIG. 3, in the battery module 4, a plurality of secondary batteries 5 can be sequentially arranged along the length direction of the battery module 4. Of course, any other arrangements are also possible. The plurality of secondary batteries 5 may further be fixed by fasteners.

Optionally, the battery module 4 can further include a shell having an accommodating space, in which the plurality of secondary batteries 5 are accommodated.

In some embodiments, the battery module may further be assembled into a battery pack, the number of battery module contained in the battery pack may be one or more, and the specific number can be selected by those skilled in the art according to the use and capacity of the battery pack.

Figure 4:
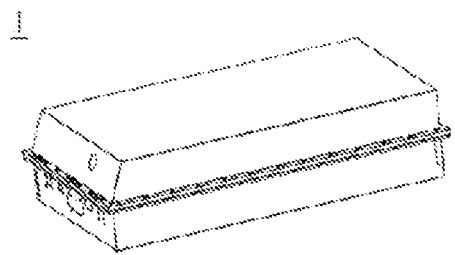
FIG. 4 is a schematic view of a battery pack according to an embodiment of the present application.
Figure 5:
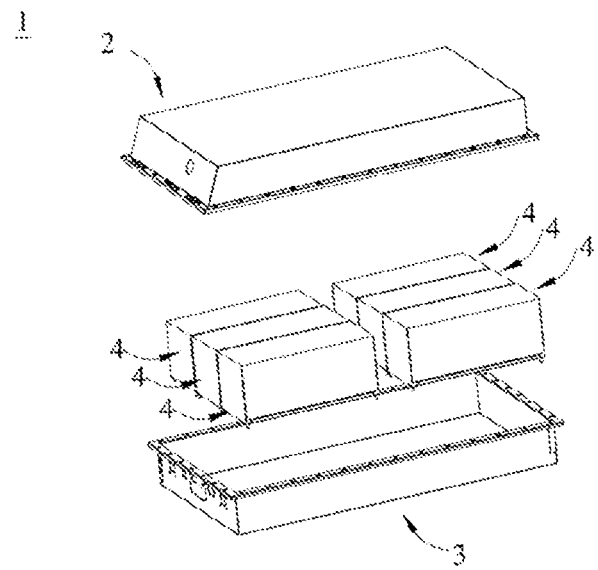
FIG. 5 is an exploded view of the battery pack according to an embodiment of the present application shown in FIG. 4.

FIGS. 4 and 5 show a battery pack 1 as an example. Referring to FIGS. 4 and 5, the battery pack 1 may comprise a battery box and a plurality of battery modules 4 provided in the battery box. The battery box includes an upper box body 2 and a lower box body 3, the upper box body 2 can cover the lower box body 3 to form a closed space for accommodating the battery modules 4. The plurality of battery modules 4 may be arranged in the battery box in any manner.

In addition, the present application further provides an electrical apparatus, and the electrical apparatus includes at least one of the secondary batteries, battery module, or battery pack provided in the present application. The secondary battery, battery module, or battery pack can be used as a power source for the electrical apparatus, and can also be used as an energy storage unit for the electrical apparatus. The electrical apparatus may include, but is not limited to, a mobile device (such as a mobile phone, and a laptop), an electric vehicle (such as an all-electric vehicle, a hybrid electric vehicle, a plug-in hybrid electric vehicle, an electric bicycle, an electric scooter, an electric golf cart, and an electric truck), an electric train, a ship, a satellite, and an energy storage system, etc.

For the electrical apparatus, the secondary battery, battery module, or the battery pack may be selected according to its use requirements.

Figure 6:
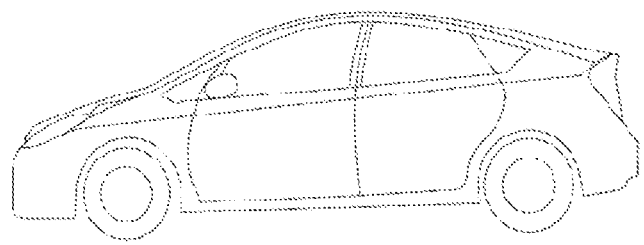
FIG. 6 is a schematic view of an electrical apparatus in which a secondary battery is used as a power source according to an embodiment of the present application.

FIG. 6 is an example of an electrical apparatus. The electrical apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

As another example, the apparatus may be a mobile phone, a tablet, a laptop, etc. The apparatus is generally required to be light and thin, and may use a secondary battery as a power source.

EXAMPLES

Examples of the present application will be described hereinafter. The examples described below are exemplary and only used to explain the present application, and are not to be construed as limiting the present application.

Where specific techniques or conditions are not specified in the examples, the techniques or conditions described in the literatures of the art or the product specifications are followed. All of the agents or instruments used in the examples that are not specified with the manufacturer are conventional commercially-available products.

Preparation Method

The electrolyte solution of the present application and the secondary battery comprising the electrolyte solution were prepared according to the contents of the components shown in Table 1 and the following steps. The electrolyte solution and the corresponding lithium-ion battery in the comparative examples were also prepared in the same manner.

1. Preparation of Electrolyte Solution

In a dry room at a temperature of 23±1° C., the electrolyte solution was prepared according to Table 1 below. First, the solvent components (such as fluorinated solvent and/or non-fluorinated solvent) were mixed according to Table 1 to prepare an organic solvent. Then, the corresponding contents of the electrolyte lithium salt and lithium halide salt were added into the organic solvent, and mixed uniformly by conventional means to obtain the electrolyte solution of the present application.

2. Preparation of Positive Electrode Plate

The positive electrode active material lithium nickel cobalt manganese oxide ($NCM_{523}$), the binder polyvinylidene fluoride (PVDF), and the conductive agent acetylene black were mixed according to the mass ratio of 98:1:1. The obtained mixture was added into an organic solvent N-methylpyrrolidone (NMP) until the system was uniform and transparent (solid content, 73%), and stirred by a vacuum stirrer to prepare a positive electrode active material slurry. The positive electrode active material slurry was evenly coated on the current collector aluminum foil with a load of 20 mg/cm$^2$ and dried at 85° C., then cold pressed and cut into strips (width 31±0.5 mm), to obtain a positive electrode plate.

3. Preparation of Negative Electrode Plate

The negative electrode active material graphite, the conductive agent Super P, the thickener carboxymethyl cellulose (CMC) and the binder styrene butadiene rubber (SBR) in a mass ratio of 97:1:1:1 were evenly mixed with deionized water to make a negative electrode active material slurry (solid content, 52%). Then, the negative electrode active material slurry was evenly coated on the copper foil of the current collector with a load of 11.5 g/cm$^2$, dried at 85° C., cold pressed and cut into strips (width 32±0.5 mm), to obtain a negative electrode plate.

4. Preparation of Lithium-Ion Battery

The polypropylene film cut into strips (width 33.5±0.5 mm) was used as the separator, and the prepared positive electrode plate, separator, and negative electrode plate were sequentially aligned and stacked in the order of "positive electrode plate-separator film-negative electrode plate", so that the separator was in the middle of the positive and negative electrode plates and was tightly attached to the positive and negative electrode plates respectively (the tension of the electrode plate was 120±5 g, the tension of the separator was 110±5 g), and then they were wound to obtain a bare battery cell. The bare battery cell was placed in the outer package of the battery, and then 28±0.5 g of the electrolyte solution was injected, and after packaging, standing, formation, reshaped, and capacity testing, a lithium-ion secondary battery was prepared.

Methods for Electrolyte Solution Performance Test

1. Determination of Conductivity of Electrolyte Solution

The electrolyte solution sample to be tested was put into a platinum black conductivity cell (Ark FZ-705W) in a glove box and sealed, and then using electrochemical impedance spectroscopy (EIS) (Solartron 1260/1287, test conditions: amplitude 2-10 mV, with the test starting with a frequency of 0.1 HZ and continuing until 100000-200000 Hz) to measure the impedance curve and calculate the conductivity of the electrolyte solution.

2. Evaluation of Combustion Performance of Electrolyte Solution

The flammability of the electrolyte solution was evaluated by self-extinguishing time (SET for short). The specific steps were as follows. Glass wool balls with a diameter of about 3 mm to 5 mm were made from raw material glass fiber cotton, and placed on a wire mesh. Samples of electrolyte solutions to be tested (the samples were different in the composition of electrolyte solution) were taken and injected into the glass wool balls using syringes. It was ignited quickly after injection (ignition time was controlled within 2 s), the time interval between the moment when the ignition device was removed and the moment when the flame was automatically extinguished was recorded, and this time interval is called the self-extinguishing time. The mass difference of the syringe before and after injection was measured, and recorded as the mass of the injected electrolyte solution. Then, the self-extinguishing time per unit mass of electrolyte solution was calculated, and used to evaluate the flame retardancy of each electrolyte solution sample: the shorter the self-extinguishing time per unit mass of electrolyte solution, the better the flame retardancy.

3. Test of First-Cycle Discharge Specific Capacity and First-Cycle Efficiency of Lithium-Ion Secondary Battery The prepared lithium-ion secondary battery was charged to 4.25V with a constant current of 1.5 mA/cm$^2$ at 25° C., and then charged with a constant voltage of 4.25V until the current dropped to 0.3 mA/cm$^2$ to obtain the first-cycle charge specific capacity (Cc1); and then discharged to 3.0V with a constant current of 1.5 mA/cm$^2$ to obtain the first-cycle discharge specific capacity (Cd1). The first-cycle efficiency of the lithium-ion battery was calculated according to the following formula.

Lithium-ion battery first-cycle efficiency=first-cycle discharge specific capacity (Cd1)/first-cycle charge specific capacity(Cc1)

4. Test of Energy Density of Lithium-Ion Battery

The prepared lithium-ion battery was charged to 4.25V with a constant current of 1.5 mA/cm$^2$ at 25° C., and then charged with a constant voltage of 4.25V until the current dropped to 0.3 mA/cm$^2$; then discharged to 3.0V with a constant current of 1.5 mA/cm$^2$. The energy of the lithium-ion battery was measured, and the energy density of the lithium-ion battery was measured according to the following formula.

Energy density (Wh/kg)=battery energy/battery mass

5. Test of Capacity Retention Rate of Lithium-Ion Battery

The lithium-ion battery was charged to 4.25V with a constant current of 1.5 mA/cm$^2$ at 25° C., then charged with a constant voltage of 4.25V until the current dropped to 0.3 mA/cm$^2$, and then discharged with a constant current of 1.5 mA/cm$^2$ to 3.0V to obtain the first-cycle discharge specific capacity (Cd1); the battery was so repeatedly charged and discharged until cycle n, the discharge specific capacity of the lithium-ion battery after n cycles was obtained, which was recorded as Cdn, and the capacity retention rate of the lithium-ion battery was calculated according to the following formula:

Capacity retention rate=discharge specific capacity after n cycles(Cdn)/first-cycle discharge specific capacity(Cd1).

6. Test of Inhibition of Lithium Dendrite Growth—Observation of the Surface of the Negative Electrode Plate The above lithium-ion battery after 100 cycles was disassembled, and the surface morphology of the negative electrode plate was observed through an optical microscope to determine whether lithium dendrites were formed.

The specific test data for the examples and comparative examples are shown in Table 1 below.

It should be noted that in Table 1 below, $t=[(k*a*c)/(k*a+c)]/b$, k, a, b and c are as defined above. From the original value calculated according to the above formula, the value of t is obtained by discarding the next digit and retaining three significant digits.

TABLE 1

| No. | Lithium salt and concentration | Organic solvent and weight ratio | t | LiX and content (wt %) | Conductivity (mS/cm) | SET evaluation (s) | Energy density (wh/kg) | First-cycle specific capacity (mAh/g) | First-cycle efficiency (%) | Capacity retention rate after 200 cycles (%) | Lithium dendrite |
|---|---|---|---|---|---|---|---|---|---|---|---|
| Example 1 | 2M LIFSI | FEC/FEMC/HFE (3:4:3) | 0.0198 | 2% LiI | 9.08 | 8 | 342 | 183 | 93.2 | 91.1 | None |
| Example 2 | 2M LIFSI | FEC/FEMC/HFE (3:4:3) | 0.000500 | 0.05% LiI | 8.71 | 18 | 322 | 169 | 91.8 | 89.4 | None |
| Example 3 | 2M LIFSI | FEC/FEMC/HFE (3:4:3) | 0.0100 | 1% LiI | 8.77 | 15 | 328 | 173 | 92.2 | 89.9 | None |
| Example 4 | 2M LIFSI | FEC/FEMC/HFE (3:4:3) | 0.0149 | 1.5% LiI | 8.83 | 13 | 333 | 175 | 92.5 | 90.1 | None |
| Example 5 | 2M LIFSI | FEC/FEMC/HFE (3:4:3) | 0.0296 | 3% LiI | 8.89 | 11 | 337 | 178 | 92.8 | 90.4 | None |
| Example 6 | 2M LIFSI | FEC/FEMC/HFE (3:4:3) | 0.0392 | 4% LiI | 8.86 | 12 | 334 | 176 | 92.7 | 90.2 | None |
| Example 7 | 2M LIFSI | FEC/FEMC/HFE (3:4:3) | 0.0583 | 6% LiI | 8.75 | 16 | 327 | 171 | 91.9 | 89.7 | None |
| Example 8 | 2M LIFSI | FEC/FEMC/HFE (3:4:3) | 0.0769 | 8% LiI | 8.72 | 17 | 325 | 170 | 91.8 | 89.5 | None |
| Example 9 | 2M LIFSI | FEC/FEMC/HFE (3:4:3) | 0.0952 | 10% LiI | 8.69 | 19 | 320 | 168 | 91.8 | 89.3 | None |
| Example 10 | 2M LIFSI | FEC/FEMC/HFE (3:4:3) | 0.000100 | 0.01% LiI | 8.32 | 26 | 311 | 158 | 85.7 | 82.3 | Moderate |
| Example 11 | 2M LIFSI | FEC/FEMC/HFE (3:4:3) | 0.000300 | 0.03% LiI | 8.36 | 22 | 315 | 160 | 86.1 | 82.5 | Slight |
| Example 12 | 2M LIFSI | FEC/FEMC/HFE (3:4:3) | 0.113 | 12% LiI | 8.29 | 28 | 308 | 154 | 85.2 | 81.9 | Slight |
| Example 13 | 2M LIFSI | FEC/FEMC/HFE (3:4:3) | 0.0198 | 2% LiBr | 8.76 | 15 | 327 | 172 | 92.1 | 89.8 | None |
| Example 14 | 2M LIFSI | FEC/FEMC/HFE (3:4:3) | 0.0198 | 2% LiCl | 8.71 | 18 | 323 | 170 | 91.7 | 89.3 | None |
| Example 15 | 2M LIFSI | FEC/FEMC/HFE (3:4:3) | 0.0198 | 2% LiF | 8.67 | 20 | 317 | 165 | 91.5 | 88.9 | None |
| Example 16 | 2M LIFSI | FEC/FEMC/HFE (1:8:1) | 0.0198 | 2% LiI | 8.73 | 18 | 324 | 169 | 91.7 | 89.3 | None |
| Example 17 | 2M LIFSI | FEC/FEMC/HFE (2:6:2) | 0.0198 | 2% LiI | 8.86 | 13 | 336 | 177 | 92.8 | 90.4 | None |
| Example 18 | 2M LIFSI | FEC/FEMC/HFE (4:2:4) | 0.0198 | 2% LiI | 8.77 | 15 | 327 | 175 | 92.4 | 90.1 | None |
| Example 19 | 2M LIFSI | FEC/HFE (5:5) | 0.0198 | 2% LiI | 8.71 | 18 | 321 | 170 | 91.7 | 89.3 | None |
| Example 20 | 2M LIFSI | FEMC | 0.0198 | 2% LiI | 8.66 | 21 | 317 | 165 | 91.3 | 88.8 | None |
| Example 21 | 2M LIFSI | FEC | 0.0198 | 2% LiI | 8.64 | 23 | 314 | 162 | 90.9 | 88.5 | None |
| Example 22 | 2M LIFSI | HFE | 0.0198 | 2% LiI | 8.61 | 24 | 312 | 159 | 90.5 | 88.2 | None |
| Example 23 | 2M LIFSI | 20%[1] FEC/FEMC/HFE (3:4:3):80% EMC | 0.00396 | 2% LiI | 8.51 | 28 | 306 | 153 | 89.8 | 87.1 | None |
| Example 24 | 2M LIFSI | 50% FEC/FEMC/HFE (3:4:3):50% EMC | 0.00990 | 2% LiI | 8.54 | 27 | 308 | 155 | 90.1 | 87.5 | None |
| Example 25 | 2M LIFSI | 80% FEC/FEMC/HFE (3:4:3):20% EMC | 0.0158 | 2% LiI | 8.59 | 25 | 310 | 157 | 90.3 | 87.9 | None |
| Example 26 | 2M LIFSI | 90% FEC/FEMC/HFE (3:4:3):10% EMC | 0.0178 | 2% LiI | 8.70 | 19 | 322 | 163 | 91.4 | 88.7 | None |
| Example 27 | 2M LIFSI | 95% FEC/FEMC/HFE (3:4:3):5% EMC | 0.0188 | 2% LiI | 8.82 | 13 | 331 | 178 | 92.5 | 90.7 | None |
| Example 28 | 2M LIFSI | 10% FEC/FEMC/HFE (3:4:3):90% EMC | 0.00198 | 2% LiI | 8.32 | 30 | 305 | 152 | 85.7 | 82.3 | None |
| Example 29 | 0.5M LIFSI | FEC/FEMC/HFE (3:4:3) | 0.0192 | 2% LiI | 8.78 | 17 | 326 | 172 | 91.7 | 89.5 | None |
| Example 30 | 1M LIFSI | FEC/FEMC/HFE (3:4:3) | 0.0196 | 2% LiI | 8.82 | 15 | 330 | 170 | 91.9 | 89.8 | None |
| Example 31 | 3M LIFSI | FEC/FEMC/HFE (3:4:3) | 0.0198 | 2% LiI | 8.86 | 12 | 335 | 176 | 92.6 | 90.2 | None |

TABLE 1-continued

| No. | Lithium salt and concentration | Organic solvent and weight ratio | t | LiX and content (wt %) | Conductivity (mS/cm) | SET evaluation (s) | Energy density (wh/kg) | First-cycle specific capacity (mAh/g) | First-cycle efficiency (%) | Capacity retention rate after 200 cycles (%) | Lithium dendrite |
|---|---|---|---|---|---|---|---|---|---|---|---|
| Example 32 | 4M LiFSI | FEC/FEMC/HFE (3:4:3) | 0.0199 | 2% LiI | 8.84 | 14 | 332 | 173 | 92.2 | 90.1 | None |
| Example 33 | 5M LiFSI | FEC/FEMC/HFE (3:4:3) | 0.0199 | 2% LiI | 8.75 | 20 | 322 | 175 | 91.4 | 89.2 | None |
| Example 34 | 6M LiFSI | FEC/FEMC/HFE (3:4:3) | 0.0199 | 2% LiI | 8.72 | 21 | 320 | 171 | 91.1 | 88.9 | None |
| Example 35 | 8M LiFSI | FEC/FEMC/HFE (3:4:3) | 0.0200 | 2% LiI | 8.68 | 24 | 317 | 167 | 90.7 | 88.5 | None |
| Example 36 | 0.4M LiFSI | FEC/FEMC/HFE (3:4:3) | 0.0190 | 2% LiI | 8.52 | 28 | 308 | 160 | 88.7 | 82.3 | None |
| Example 37 | 9M LiFSI | FEC/FEMC/HFE (3:4:3) | 0.0200 | 2% LiI | 8.47 | 30 | 301 | 155 | 85.5 | 81.7 | None |
| Example 38 | 2M LiTFSI | FEC/FEMC/HFE (3:4:3) | 0.0198 | 2% LiI | 8.87 | 12 | 338 | 176 | 92.5 | 90.1 | None |
| Example 39 | 2M (30% LiFSI + 70% LiPF6)[2] | FEC/FEMC/HFE (3:4:3) | 0.0194 | 2% LiI | 8.61 | 31 | 309 | 154 | 89.8 | 87.1 | None |
| Example 40 | 2M (40% LiFSI + 60% LiPF6) | FEC/FEMC/HFE (3:4:3) | 0.0195 | 2% LiI | 8.63 | 28 | 315 | 157 | 90.2 | 87.2 | None |
| Example 41 | 2M (50% LiFSI + 50% LiPF6) | FEC/FEMC/HFE (3:4:3) | 0.0196 | 2% LiI | 8.67 | 25 | 321 | 162 | 90.7 | 87.7 | None |
| Example 42 | 2M (60% LiFSI + 40% LiPF6) | FEC/FEMC/HFE (3:4:3) | 0.0197 | 2% LiI | 8.71 | 22 | 325 | 164 | 91.1 | 88.2 | None |
| Example 43 | 2M (70% LiFSI + 30% LiPF6) | FEC/FEMC/HFE (3:4:3) | 0.0197 | 2% LiI | 8.74 | 20 | 327 | 168 | 91.5 | 88.7 | None |
| Example 44 | 2M (80% LiFSI + 20% LiPF6) | FEC/FEMC/HFE (3:4:3) | 0.0198 | 2% LiI | 8.78 | 18 | 331 | 172 | 91.9 | 89.4 | None |
| Example 45 | 2M (90% LiFSI + 10% LiPF6) | FEC/FEMC/HFE (3:4:3) | 0.0198 | 2% LiI | 8.82 | 16 | 335 | 176 | 92.4 | 89.7 | None |
| Example 46 | 2M (25% LiFSI + 75% LiPF6) | FEC/FEMC/HFE (3:4:3) | 0.0192 | 2% LiI | 8.52 | 36 | 301 | 147 | 86.5 | 84.5 | None |
| Example 47 | 2M (20% LiFSI + 80% LiPF6) | FEC/FEMC/HFE (3:4:3) | 0.0190 | 2% LiI | 8.46 | 40 | 292 | 141 | 84.5 | 82.3 | Slight |
| Comparative Example 1 | 2M LiFSI | EMC | — | 2% LiI | 8.12 | 42 | 285 | 140 | 70.7 | 72.1 | Severe |
| Comparative Example 2 | 2M LiFSI | FEC/FEMC/HFE (3:4:3) | — | 0 | 8.09 | 40 | 280 | 134 | 70.1 | 71.8 | Severe |
| Comparative Example 3 | 2M LiPF6 | FEC/FEMC/HFE (3:4:3) | — | 2% LiI | 8.01 | 37 | 276 | 129 | 69.3 | 71.3 | Severe |

[1]In Examples 23 to 28, the percentage here is the weight percentage based on the total weight of the organic solvent
[2]In Examples 39-47, the percentages in this column are molar percentages based on the total molar weight of the electrolyte lithium salt.

The examples and comparative examples of the present application prove that the electrolyte solution of the present application has good conductivity by comprising fluorinated solvents, fluorine-containing electrolyte salts and lithium halide salts, and has achieved good safety performance at higher working voltages, such as improved flame retardancy, and significantly inhibited growth of lithium dendrites, thereby improving the safety performance of the battery. In addition, the electrolyte solution of the present application can improve the energy density, output performance, and cycling performance of lithium-ion secondary batteries.

In particular, the electrolyte solution of the present application can effectively increase the first-cycle efficiency of the battery—the first-cycle efficiency of the lithium-ion battery comprising the electrolyte solution of the present application is more than 85%, reduces the initial irreversible capacity loss of the battery and further improves the energy density.

In addition, comparing the data of the above examples and comparative examples, it can be seen that there is a "synergistic effect" between the fluorinated solvent, the fluorine-containing electrolyte salt and the lithium halide salt comprised in the electrolyte solution of the present application, which can effectively inhibit the growth of lithium dendrites in lithium ion secondary batteries with graphite as the negative electrode. It can be seen from the above table that the lithium dendrites of the lithium-ion battery after 200 cycles are significantly suppressed by using the electrolyte solution of the present application, indicating that the electrolyte solution of the present application helps to improve the interface composition and lithium deposition morphology of the negative electrode surface, and can effectively inhibit the growth of lithium dendrites during battery cycling and improve the cycling performance.

In summary, the electrolyte solution of the present application can inhibit the growth of lithium dendrites in lithium-ion batteries, improve battery lithium plating, improve battery cycling performance, improve flame retardancy, and improve battery energy density, effectively solving the defects existing in the prior art.

It should be noted that the present application is not limited to the embodiments above. The above-described embodiments are merely illustrative, and embodiments having substantively the same composition as the technical idea and exerting the same effects within the scope of the technical solution of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

What is claimed is:

1. An electrolyte solution, comprising an organic solvent containing a fluorinated solvent, an electrolyte lithium salt, and an additive;
   wherein
   the organic solvent containing a fluorinated solvent is one selected from:
   (i) a combination of at least two selected from fluoroethylene carbonate (FEC), fluoroethyl methylcarbonate (FEMC), 3-(2,2,3,3-tetrafluoropropoxy)-1,2-propylene oxide, 1,1,2,2-tetrafluoroethyl-2,2,3,3-tetrafluoropropyl ether, methyl nonafluorobutyl ether, ethyl nonafluorobutyl ether, 1,1,2,2-tetrafluoroethyl-2,2,2-trifluoroethyl ether, and nonafluoroisobutyl methyl ether,
   (ii) a combination of at least two selected from fluoroethylene carbonate (FEC), 3-(2,2,3,3-tetrafluoropropoxy)-1,2-propylene oxide, 1,1,2,2-tetrafluoroethyl-2,2,3,3-tetrafluoropropyl ether, methyl nonafluorobutyl ether, ethyl nonafluorobutyl ether, 1,1,2,2-tetrafluoroethyl-2,2,2-trifluoroethyl ether and nonafluoroisobutyl methyl ether,
   (iii) fluoroethyl methylcarbonate (FEMC),
   (iv) fluoroethylene carbonate (FEC),
   (v) a hydrofluoroether(s) (HFE) selected from at least one of 3-(2,2,3,3-Tetrafluoropropoxy)-1,2-propylene oxide, 1,1,2,2-tetrafluoroethyl-2,2,3,3-tetrafluoropropyl ether, methylnonafluorobutyl ether, ethyl nonafluorobutyl ether, 1,1,2,2-tetrafluoroethyl-2,2,2-trifluoroethyl ether and nonafluoroisobutyl methyl ether, or
   (vi) a combination of ethyl methyl carbonate (EMC) and a hydrofluoroether(s) (HFE) selected from at least one of fluoroethylene carbonate (FEC), Fluoroethyl methyl carbonate (FEMC), 3-(2,2,3,3-tetrafluoropropoxy)-1,2-propylene oxide, 1,1,2,2-tetrafluoroethyl-2,2,3,3-tetrafluoropropyl ether, methyl nonafluorobutyl ether, ethyl nonafluorobutyl ether, 1,1,2,2-tetrafluoroethyl-2,2,2-trifluoroethyl ether, and nonafluoroisobutyl methyl ether;
   the electrolyte lithium salt comprises a fluorine-containing sulfonylimide lithium salt;
   the additive comprises a lithium halide salt;
   the fluorine-containing sulfonylimide lithium salt, lithium halide salt, and fluorinated solvent satisfy: $t = [(k*a*c)/(k*a+c)]/b$, and t is from 0.0004 to 0.1000,
   k is a molar concentration of the electrolyte lithium salt in the electrolyte solution, a unit of the molar concentration is mol/L,
   a is a molar percent of the fluorine-containing sulfonylimide lithium salt relative to a total molar amount of the electrolyte lithium salt,
   b is a weight percentage of the fluorinated solvent relative to a total weight of the organic solvent,
   c is a weight percentage of the lithium halide salt relative to a total weight of the electrolyte, and
   a, b, c, and k each are not 0.

2. The electrolyte solution according to claim 1, wherein based on a total weight of the organic solvent, a content of the fluorinated solvent is 20% by weight or more.

3. The electrolyte solution according to claim 1, wherein a molar concentration of the electrolyte lithium salt is 0.5 mol/L to 8 mol/L.

4. The electrolyte solution according to claim 1, wherein based on a total weight of the electrolyte solution, a content of the lithium halide salt is 0.05% by weight to 10% by weight.

5. The electrolyte solution according to claim 1, wherein based on a total molar weight of the electrolyte lithium salt, a molar percentage of the fluorine-containing sulfonylimide lithium salt is at least 30%.

6. The electrolyte solution according to claim 1, wherein the lithium halide salt is selected from at least one of lithium iodide, lithium bromide, lithium chloride, and lithium fluoride.

7. The electrolyte solution according to claim 1, wherein the fluorine-containing sulfonylimide lithium salt is selected from at least one of lithium bis(fluorosulfonyl) imide, lithium bis(trifluoromethanesulfonyl) imide, lithium bis(pentafluoroethanesulfonyl) imide and lithium bis(perfluoro-1-butanesulfonyl) imide.

8. The electrolyte solution according to claim 1, wherein the electrolyte lithium salt further includes at least one of lithium hexafluorophosphate, lithium tetrafluoroborate, lithium hexafluoroarsenate, and lithium perchlorate.

9. The electrolyte solution according to claim 1, further comprising at least one of a film-forming additive, a flame retardant additive, an anti-overcharge additive, and a conductive additive.

10. A lithium ion secondary battery, comprising the electrolyte solution of claim 1.

11. A battery module comprising a secondary battery according to claim 10.

12. A battery pack comprising the battery module according to claim 11.

13. A power consumption device, comprising the secondary battery according to claim 10.

\* \* \* \* \*